US006589655B2

(12) United States Patent
Matuana et al.

(10) Patent No.: US 6,589,655 B2
(45) Date of Patent: Jul. 8, 2003

(54) VENEER-BASED PRODUCT AND METHOD OF MANUFACTURE

(75) Inventors: Laurent Malanda Matuana, Houghton, MI (US); Julia A. King, Laurium, MI (US)

(73) Assignee: Board of Control of Michigan Technological University, Houghton, MI (US)

( * ) Notice: Subject to any disclaimer, the term of this patent is extended or adjusted under 35 U.S.C. 154(b) by 0 days.

(21) Appl. No.: 09/905,168

(22) Filed: Jul. 13, 2001

(65) Prior Publication Data

US 2002/0039661 A1 Apr. 4, 2002

Related U.S. Application Data

(60) Provisional application No. 60/218,463, filed on Jul. 14, 2000.

(51) Int. Cl.$^7$ ................................................. B32B 27/38
(52) U.S. Cl. ..................... 428/414; 428/423.1; 428/481; 428/524; 428/532; 428/536; 428/537.1; 156/307.3; 156/278; 156/513; 264/241
(58) Field of Search ................................. 428/532, 536, 428/537.1, 524, 414, 423.11, 481; 156/307.3, 278, 513; 264/241

(56) References Cited

U.S. PATENT DOCUMENTS

| | | | | |
|---|---|---|---|---|
| 4,070,019 A | | 1/1978 | Segal et al. ................ 473/536 |
| 4,533,589 A | * | 8/1985 | Sewell ....................... 428/174 |
| 4,592,962 A | | 6/1986 | Aoki et al. ................. 428/541 |
| 4,615,936 A | | 10/1986 | Baum ......................... 442/413 |
| 4,940,741 A | | 7/1990 | De Wacker et al. .......... 524/47 |
| 5,002,713 A | | 3/1991 | Palardy et al. .............. 264/109 |
| 5,028,286 A | | 7/1991 | Hsu ............................ 156/624 |
| 5,059,264 A | | 10/1991 | Sheets ........................ 156/62.2 |
| 5,367,040 A | | 11/1994 | Teodorczyk ................. 528/137 |
| 5,432,000 A | | 7/1995 | Young, Sr. et al. .......... 428/372 |
| 5,620,642 A | | 4/1997 | Kamite et al. .............. 264/115 |
| 5,629,083 A | | 5/1997 | Teodorczyk ............. 428/308.8 |
| 5,635,123 A | | 6/1997 | Riebel et al. ................ 264/125 |
| 5,736,218 A | | 4/1998 | Iwata et al. ................. 428/107 |
| 6,010,793 A | | 1/2000 | Yoshimura et al. ....... 428/537.1 |
| 6,124,028 A | | 9/2000 | Nagle et al. ............. 428/308.8 |
| 6,217,413 B1 | | 4/2001 | Christianson ................ 451/28 |
| 6,348,119 B1 | | 2/2002 | Leonte et al. ............. 156/273.9 |

OTHER PUBLICATIONS

Holmes, C.A., Effect of Fire–Retardant Treatments on Performance Properties of Wood, Wood Technology: Chemical Aspects. ACS Symposium Series 43: 83–106 (1977).

L. Constantino, B. Gellner, M. Percy; Market Share Competition Between Plywood and Non–Veneered Structural Wood Panels in Canada and The United States, Working Paper 129, Mar. 1989; Forest Economics and Policy Analysis Research Unit, Vancouver, B.C. Canada V6T 1Z8.

John A. Youngquist, Andrzej Krzysik, Roger M. Rowell; Dimensional Stability of Acetylated Aspen Flakeboard; Wood and Fiber Science 18 (1), Jan. 1986; pp. 90–98.

Byung–Dae Park, Bernard Riedl, Ernest W. Hsu, Jack Shields; Differential Scanning Calorimetry of Phenol–Formaldehyde Resins Cure–Accelerated by Carbonates; Polymer 40; 1689–1699; 1999.

Robert L. Geimer, Jin Heon Kwon, James Bolton; Flakeboard Thickness Swelling, Part I. Stress Relaxation in a Flakeboard Mat; Wood and Fiber Science 30 (4); Oct. 1998, pp. 326–338.

(List continued on next page.)

Primary Examiner—Leszek Kiliman
(74) Attorney, Agent, or Firm—Michael Best & Friedrich LLP

(57) ABSTRACT

A veneer-based product is made of a plurality of veneer layers, a resin binding the layers, and a filler having a high thermal conductivity.

33 Claims, 1 Drawing Sheet

OTHER PUBLICATIONS

Robert L. Geimer, Jin Heon Kwon; Flakeboard Thickness Swelling. Part II. Fundamental Response of Board Properties to Steam Injection Pressing; Wood and Fiber Science 31 (1); Jan. 1999; pp. 15–27.

A. Pizzi; Phenolic Resin Wood Adhesives, In Pizzi, A., (ed.) Wood Adhesives, Chemistry and Technology, Marcel Dekker, New York, pp. 105–176 (1983).

Lawrence Gollob; The Correlation Between Preparation and Properties in Phenolic Resins, In: Pizzi, A. (ed.) Wood Adhesives, Chemistry and Technology, vol. 2, Marcel Dekker, New York, p. 121–153 (1989).

David A. Pease, Ted Blackman, Thea Hillman, Sharman George; Panels; Products, Applications and Production Trends 2nd Edition; Miller Freeman; 1996; pp. 134–137.

Maloney, T.M.; Modern particleboard and dry–process fiberboard manufacturing. Updated edition. Miller Freeman Publications, Inc., San Francisco, Calif. (1993).

Heebink, B.G. and F.V. Hefty, Steam Post–treatments to Reduce Thickness Swelling of Particleboard, U.S. For. Ser. Res. Note FPL–0187, Madison, WI (1968).

Sellers, T. Jr., Plywood and Adhesive Technology, Marcel Dekker Inc., New York, NY (1985).

Crow's, Oriented Strand Board, Forest Industry Journal, C.C. Crow Publications Inc., vol. 12, No. 4 (Oct. 1997).

* cited by examiner

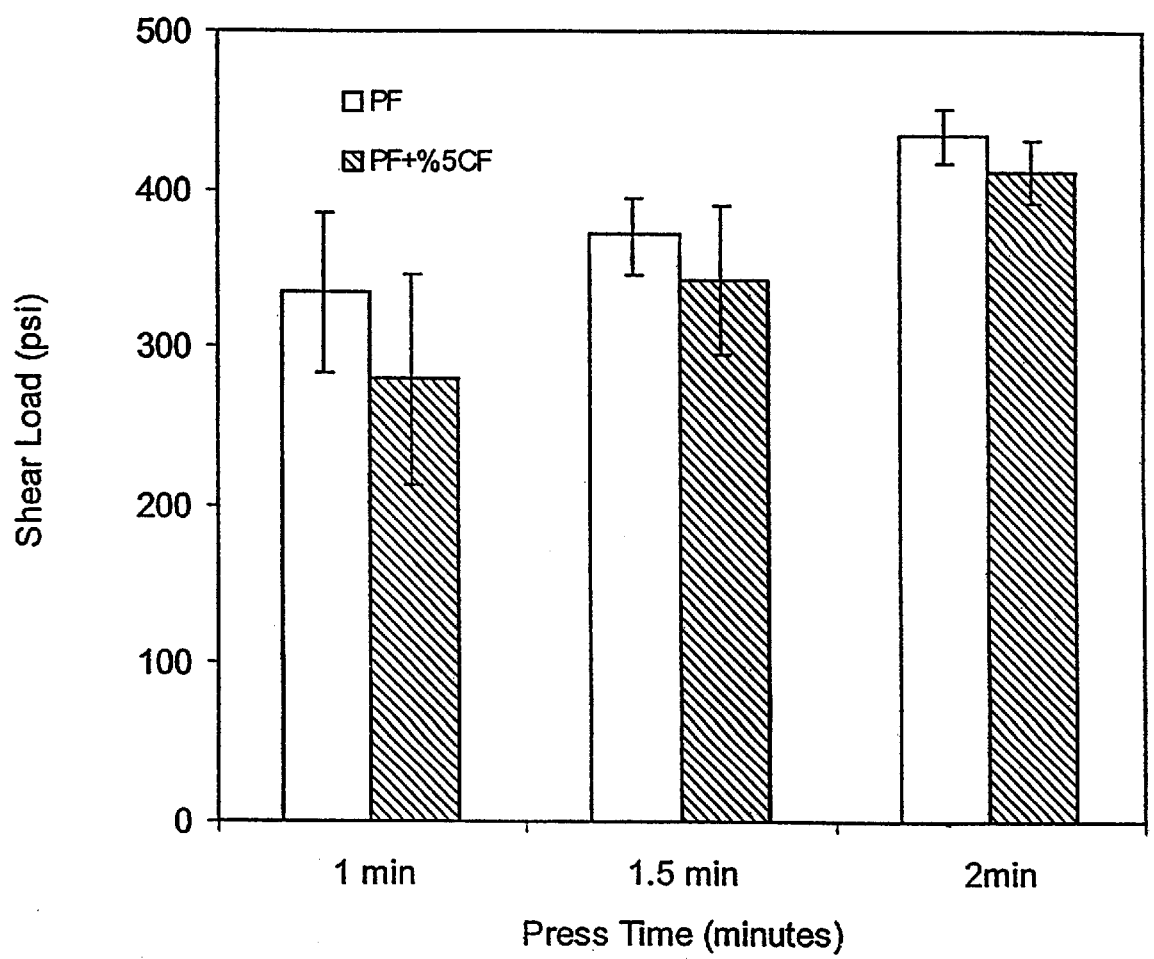

VENEER-BASED PRODUCT AND METHOD OF MANUFACTURE

CROSS-REFERENCE TO RELATED APPLICATIONS

This application claims priority under 35 U.S.C. § 119 to provisional patent application No. 60/218,463 filed Jul. 14, 2000.

FIELD OF THE INVENTION

The present invention relates generally to veneer-based products such as plywood products, laminated veneer lumber (LVL), and parallel strand lumber (PSL). More particularly the present invention relates to the method of manufacture, and products made therefrom, thereof of using a filler having high thermal conductivity, such as metals, carbides, nitrides and carbons in the manufacture of such plywood boards and panels.

BACKGROUND OF THE INVENTION

Plywood is a panel product manufactured by gluing together one or more veneers to both sides of a veneer, solid wood, or reconstituted wood core. In the case of solid-wood-core plywood and reconstituted-wood-core plywood, an additional intermediate step is the production of cores, which are made by lateral gluing of blocks or strips of wood or by gluing oriented wood chips or flakes with resin adhesives. Plywood has many advantages over natural wood, an important one being greater dimensional stability. Its uniformity of strength, resistance to splitting, panel form, and decorative value make it adaptable to various uses.

In plywood, both structural and decorative plywood, the grain of alternate layers is typically crossed, in general at right angles; species, thickness, and grain direction of each layer are matched with those of their opposite number on the other side of the core. The total number of layers of veneers is typically odd (three, five, or more) so that the panel is balanced around its central axis. This makes plywood stable and less likely to cup, warp, shrink or swell. Thus assembled, the panels are brought to presses, most often hot presses, for gluing with either natural (animal, casein, soybean, starch) or more recently synthetic resins, such as phenol-formaldehyde, urea-formaldehyde, tannin-formaldehyde and urethanes. Certain synthetic resins, such as phenol-formaldehyde, properly used, may produce joints more durable than the natural wood itself—highly resistant to weather, microorganisms, cold, hot and boiling water, and steam and dry heat.

Laminated veneer lumber (LVL) is also produced using the same technology, but unlike plywood, the laminants in LVL are oriented parallel to the longitudinal axis of the panel or beam.

Veneer used for plywood usually varies in thickness from 1/28 to 1/8 inch (0.09 to 0.32 centimeters), but both thinner and thicker veneers often are used. Thin veneers have an advantage, especially for the outer or face plies, in that they set up less severe transverse stresses with changes in moisture content thereby reducing warping and surface checking (superficial cracking) of panels. The use of thin veneer also makes valuable wood go farther. Since successively cut layers of thin veneers are similar in appearance, identical areas from adjacent sheets can be matched to make highly symmetrical ornamental patterns. In lumber-core panels, the plies next to the faces of the crossbands usually are thicker than the face plies and largely control the stability of the panel.

As already mentioned earlier, in a typical veneer-based product manufacturing process, thin sheets of veneer are cross-laminated and glued together with a hot press. Generally, a resin is used as an adhesive between the plies or veneers which bonded under heat and pressure in a hot press. In addition to high press temperatures, the use of an external catalyst may also accelerate the resin cure rate to shorten the press times. Usually a dilute acid or an acid salt (ammonium sulfate and chloride) in a 20 to 30% solution are used as external catalysts. Sodium hydroxide, carbonates, and others are also used to promote fast cure of the resins by accelerating the curing of the resin. The external catalyst is generally acceptable only if it will produce shorter press times at lower concentration in the range of 0.25 to 1% by weight of the resin.

Higher pressing temperatures are generally not preferred, at least partly due to higher energy consumption. More importantly, higher press temperatures tend to generate more volatile organic compounds (VOCs) that may adversely affect the environment. Additional equipment may be needed to prevent the escape of such VOCs. Although press times have been shortened dramatically through these approaches, there is still need to develop cost-effective and environmentally friendly approaches to reduce the press times.

SUMMARY OF THE INVENTION

The present invention relates to a plywood comprising a plurality, preferably an odd number, of wood layers, with or without a core; a resin binding these plurality of wood layers; and a filler having a high thermal conductivity mixed in with the resin. The resin is preferred to comprise one or more thermoset resin. Examples of preferred resins include, but are not limited to phenolic resins, urea resins, melamine resins, epoxy resins, urethane resins and mixtures thereof.

The present invention also relates to a method for manufacturing plywood comprising: applying an adhesive comprising a resin and a filler having a high thermal conductivity to a plurality of wood layers; stacking the plurality of wood layers with the adhesive; and applying elevated temperature and elevated pressure to the wood layers to form into the plywood.

BRIEF DESCRIPTION OF THE DRAWINGS

FIG. 1 is a chart displaying the effects of pressing time on the sheer strength of plywood (3 plies) bonded with phenol-formaldehyde and carbon/phenol-formaldehyde resins.

DETAILED DESCRIPTION OF THE INVENTION

In view of the current plywood or panels, products and method thereof, the present invention provides a different plywood board or panels and method of producing such. The present invention uses an adhesive comprising a resin with a filler having a high thermal conductivity to with resin to bond the plywood veneer or layers. The stacked wood layers are then subjected to hot press at elevated temperature and elevated pressure to produce the plywood product.

Before explaining at least one embodiment of the invention in detail, it is to be understood that the invention is not limited in this application to the details of construction and to the arrangement of the components set forth in the following description. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention.

It is an object of the present invention to provide a plywood board or panel product and method thereof which reduces the press time during plywood manufacturing.

These, together with other objects of the invention, along with the various features of novelty which characterize the invention, are pointed out with particularity in the claims annexed to and forming a part of the disclosure. For a better understanding of the invention, its operating advantages and the specific objects attained by its uses, reference should be made to the accompanying descriptive matter in which there is illustrated preferred embodiments of the invention.

The present invention can be applied to all kinds of veneer-based products including, but not limited to, plywood, plywood product, plywood panels, plywood boards, corrugated plywood products, LVL and PSL. Both structural and decorative plywood products may be produced in accordance with the teachings of the present invention.

A preferred adhesive used herein to bind the various layers, preferred to be an odd number, comprises a filler and a resin. Thermoset resins are preferred resins.

The thermoset resin, which also may be referred to as a binder, includes, but is not limited to, phenolic resin, urea resin (such as urea-formaldehyde), melamine resin, epoxy resin, tannin-formaldehyde, urethane resin and mixtures thereof. A common and preferred phenolic resin is phenol-formaldehyde (PF) resin. Both slow curing and fast curing PF resins may be used. Urethane resins, such as MDI (diphenylmethane diisocyanate) or TDI (toluene diisocyanate) based resins, may be foaming, non-foaming or mixtures thereof. Non-foaming urethane resins are preferred urethane resins. Foaming urethane resins may be used to impart desired properties either alone or with other thermoset resins disclosed here. A foaming agent may be needed for foaming resins such as foaming urethanes.

Many different materials are suitable for use in the present invention as the "filler." In order to improve heat transfer, a suitable filler should have a thermal conductivity that is higher than the thermal conductivity of the wood pieces or the thermoset resin. Typical thermal conductivity values for some common materials are 0.2 for wood or veneer, 0.2 for resins, 1 for carbon black, 10 for carbonized polyacrylonitrile (PAN) based carbon fibers, 234 for aluminum, 400 for copper, and 600 for graphite (all values in W/mK). Thus, carbon fillers will act as heat transfer medium by transferring heat from the faces to the core of the panel quicker. This faster heat transfer will shorten the press time. Carbon is also less hygroscopic than wood; therefore, carbon improves the dimensional stability, reduce water absorption, reduce linear expansion, and reduce thickness swelling of wood based composites.

Suitable fillers generally have a thermal conductivity greater than the thermal conductivity of the veneer layers and the resins. Suitable fillers having high thermal conductivity include, but are not limited to, a material selected from the group consisting of carbon filler, carbides, nitrides, metals, conducting polymers and mixtures thereof. A carbon filler may be selected from carbon fiber, metal (such as nickel) coated carbon fiber, carbon nanotubes, natural graphite, synthetic graphite (including high purity synthetic graphite), scrap graphite, various forms of coke, carbon black, and mixtures thereof. Carbides may be selected from the group consisting of silicon carbide, tungsten carbide, and mixtures thereof. Non-limiting examples of nitrides include boron nitride, various forms of silicon nitride and mixtures thereof. Suitable metals include, but are not limited to, aluminum, zinc, tungsten, iron, copper, titanium, tin, metal alloys and mixtures thereof. Many different types of known conducting polymers also may be used as the filler for the present invention. Non-limiting examples include doped or non-doped polyaniline, polypyrrole, and mixtures thereof.

The adhesive may further comprise an situ or ex-situ "catalyst." A catalyst here means a small amount of a material which can be used to increase curing of the thermoset resin, increase forming of the board or panel under the conditions, or both. Accordingly, any catalyst that is known to accelerate curing of any type of the thermoset resins disclosed herein is included, such as acid, base, etc. It should be understood that not every catalyst will work for all of the disclosed thermoset resins.

The overall plywood has a general composition, by weight percent, as follows: wood layers, 40 to 99.9; resin, 0.1 to 50; filler, 0.05 to 50; catalyst, 0 to 5. It is preferred that the weight of the filler is about 5% of the weight of the resin.

In a accordance with an exemplary embodiment of the invention, a plywood board or panel, such as but not limited to 3 ply construction, is formed with the addition of a carbon filler. A preferred embodiment being carbon fibers, such as but not limited to carbon fibers available from Conoco, Inc. with the trademark THERMOCARB®. THERMOCARB® is a high purity synthetic graphite, which has the general properties as listed in Table 1 below.

TABLE 1

| | |
|---|---|
| Ash | <0.1 wt % |
| Sulfur | 0.02 wt % |
| Vibrated Bulk Density | 0.66 g/cc |
| Density | 2.24 g/cc |
| Particle Sizing, vol % (by Sieve Method) | |
| +48 Tyler Mesh* | 4 |
| −48/+80 Tyler Mesh | 22 |
| −80/+200 Tyler Mesh | 48 |
| −200/+325 Tyler Mesh | 16 |
| −325 Tyler Mesh | 10 |
| Thermal Conductivity at 23C | 600. W/mK on a ¼" particle |
| Electrical Resistivity | $10^{-4}$ ohm-cm (approximate) |
| Particle Aspect Ratio | 2.0 |
| Particle Shape | Irregular |

*48 Tyler Mesh = 297 Microns
80 Tyler Mesh = 177 Microns
200 Tyler Mesh = 74 Microns
325 Tyler Mesh = 44 Microns It will be understood that various types of graphite or various types of carbon may be utilized with the scope of the invention.

According to the invention, carbon is added to a thermoset resin, such as liquid phenol formaldehyde (PF) resin to form a satisfactory glue bond during the manufacture of plywood products. The liquid PF resin used was GP 3121 ResiStran from Georgia-Pacific. Table 2 lists the properties of this resin.

TABLE 2

| | |
|---|---|
| pH | approx. 10 |
| Specific Gravity @ 25° C., g/cc | 1.22 |
| Wt % Volatile Matter | 46. |

Veneers, such as but not limited to Aspen (5 wt % moisture content), are bonded using pure liquid PF (as a control) and a mixture of PF synthetic graphite adhesive. The concentration of synthetic graphite in the adhesive mixture was fixed at 5% by weight of total amount of the resin. Plywood was generally formed as follows: first, 60 g/m² per single glue line of the adhesive was spread on the surface of the veneers. Second, three veneers were laid up together with the grain direction of adjacent veneers perpendicular to one another (0°/90°/0°) to form a mat. Finally, the formed mat was hot pressed at 320° F. (160° C.) using 250 psi (1725 kPa) pressure. The press closing time to full pressure was 15 seconds and the assembly times for resin curing were 1, 1.5 and 2 minutes.

The glueline performance of the manufactured product was measured using plywood shear specimens according to the procedure outlined in ASTM D906, Standard Test Method for Strength Properties of Adhesives in Plywood Type Construction in Shear by Tension Loading, to determine the failure load and percentage of wood failure.

The shear strength results in pounds per square inch (glue line performance, mean and standard deviation) are summarized in Table 3. For each material and each press time, 10 tests were conducted. These results are illustrated in FIG. 1, with 95% confidence intervals illustrated as brackets.

TABLE 3

| Composites | Shear stress (psi) | | |
|---|---|---|---|
| | 1 min | 1.5 min | 2 min |
| PF Resin Only Used | 334 ± 50 | 370 ± 24 | 434 ± 18 |
| PF + 5% THERMOCARB | 280 ± 66 | 343 ± 47 | 411 ± 20 |

FIG. 1 shows that the 95% confidence intervals overlap for all 3 pressing times for the control plywood and the plywood containing synthetic graphite.

Table 4 lists the percentage of wood failures (versus resin failure) in these samples. The results show that a press time of 1 minute did not allow sufficient time for the resin to cure. The control and the plywood containing synthetic graphite both demonstrated resin layer interface failures. For the 1.5 minute press time, the synthetic graphite containing plywood exhibited improved adhesion as indicated by the higher percentage of wood failure (versus resin failure). For the 2 minute press time, the opposite was observed.

Table 4 shows the effects of pressing time on the percentage of wood failure of plywood (3 plies) bonded with phenol-formaldehyde and phenol-formaldehyde resins.

TABLE 4

| Composites | Percentage of wood failure | | |
|---|---|---|---|
| | 1 min | 1.5 min | 2 min |
| Pure PF resin | 0 | 0–5 | 100 |
| PF + 5% Synthetic Graphite | 0 | 15 | 70 |

The present invention has been described in relation to the drawings and examples attached hereto. They are intended for illustration purposes only. It should be understood that other and further modifications, apart from those shown or suggested herein, may be made within the spirit and scope of this invention, which is defined by the above written description and the claims below.

We claim:

1. A veneer-based product comprising:

a plurality of veneer layers having a thermal conductivity;

a resin binding said plurality of veneer layers, the resin having a thermal conductivity; and a filler having particles including lengths and having a thermal conductivity, a plurality of the particles being mixed non-unidirectionally within said resin, the thermal conductivity of the filler being greater than the thermal conductivity of the veneer layers and resin.

2. The veneer-based product of claim 1, wherein the filler comprises carbon fiber.

3. The veneer-based product of claim 1, wherein the filler comprises at least one of a natural graphite, synthetic graphite and combinations thereof.

4. The veneer-based product of claim 1, wherein said filler is not in the form of woven clothe.

5. The veneer-based product of claim 1, wherein said resin comprises at least one of phenolic resin, urea resin, melamine resin, epoxy resin, urethane resin and mixtures thereof.

6. The veneer-based product of claim 1, wherein said filler comprises at least one of metal coated carbon fiber, carbon nanotubes, natural graphite, coke, synthetic graphite, carbon black, silicon carbide, silicon nitride, boron nitride, metals and mixtures thereof.

7. The veneer-based product of claim 1, further comprising a wood composite core between the veneer layers.

8. The veneer-based product of claim 1, wherein the thermal conductivity of the filler is greater than 0.2 W/mK.

9. The veneer-based product of claim 1, wherein the veneer-based product comprises 40–99.5% by weight veneer layers, 0.50–50% by weight resin and about 0.05–50% by weight filler.

10. A method for manufacturing veneer-based product, the method comprising:

applying an adhesive comprising a resin and a filler to a plurality of veneer layers, the filler having a thermal conductivity greater than a thermal conductivity of the resin;

stacking said plurality of veneer layers having adhesive applied thereto; and applying heat and pressure for a predetermined amount of time to said veneer layers to form the veneer-based product, the amount of time being less than an amount of time required for the same method when no filler is used.

11. The method of claim 10, wherein the filler is about 5% by weight of said resin.

12. The method of claim 10, wherein the filler comprises carbon fiber.

13. The method of claim 10, wherein the resin comprises at least one of phenolic resin, urea resin, melamine resin, epoxy resin, urethane resin and mixtures thereof.

14. The method of claim 10, wherein the filler comprises at least one of metal coated carbon fiber, carbon nanotubes, coke, natural graphite, synthetic graphite, scrap graphite, carbon black, silicon carbide, silicon nitride, boron nitride, metals and mixtures thereof.

15. The method of claim 10, further comprising incorporating a wood composite core between said veneer layers.

16. The method of claim 10, wherein the thermal conductivity of the filler is greater than 0.2 W/mK.

17. The method of claim 10, wherein the veneer-based product comprises about 40–99.5% by weight veneer layers, 0.50–50% by weight resin and about 0.05–50% by weight filler.

18. A method of claim 10, wherein the filler comprises particles having lengths, and wherein a plurality of the particles are mixed non-unidirectionally within said resin.

19. A method of reducing press time in the manufacture of a veneer-based product, the method comprising:

applying an adhesive comprising a resin having a thermal conductivity and a filler having a thermal conductivity to a plurality of veneer layers, the filler having a thermal conductivity greater than the thermal conductivity of the resin;

stacking said plurality of veneer layers with said adhesive; and applying elevated temperature and elevated pressure to said veneer layers to form the veneer-based product, the method having a press time that is less than a press time required for the same method when no filler is used.

20. The method of claim 18, wherein the product comprises about 40–99.5% by weight veneer layers, about 0.05–50% by weight resin and about 0.05–50% by weight filler.

21. The method of claim 19, wherein the filler comprises at least one of a synthetic graphite, natural graphite and combination thereof.

22. The method of claim 19, wherein the filler comprises particles having lengths, and wherein a plurality of the particles are mixed non-unidirectionally within said resin.

23. The method of claim 19, wherein the filler comprises at least one of metal coated carbon fiber, carbon nanotubes, natural graphite, coke, synthetic graphite, carbon black, silicon carbide, silicon nitride, boron nitride, metals and mixtures thereof.

24. The method of claim 19, wherein the filler comprises carbon fibres.

25. A veneer-based product comprising:

a plurality of veneer layers having a thermal conductivity;

a resin binding said plurality of veneer layers, the resin having a thermal conductivity; and a filler having a thermal conductivity mixed with said resin, the filler comprising at least one of metal coated carbon fiber, carbon nanotube, natural graphite, coke, synthetic graphite, scrap graphite, carbon black, silicon carbide, silicon nitride, boron nitride, metal and mixture thereof, the thermal conductivity of the filler being greater than the thermal conductivity of the veneer layers and resin.

26. The veneer-based product of claim 25, wherein the filler comprises at least one of a natural graphite, synthetic graphite and combination thereof.

27. The veneer-based product of claim 25, wherein the filler is about 5% by weight of said resin.

28. The veneer-based product of claim 25, wherein the resin comprises at least one of phenolic resin, urea resin, melamine resin, epoxy resin, urethane resin and mixtures thereof.

29. The veneer-based product of claim 25, further comprising a wood composite core between the veneer layers.

30. The veneer-based product of claim 25, wherein the thermal conductivity of the filler is greater than 0.2 W/mK.

31. The veneer-based product of claim 25, wherein the veneer-based product comprises about 40–99.5% by weight veneer layers, about 0.05–50% by weight resin and about 0.05–50% by weight filler.

32. The veneer-based product of claim 25, wherein the filler comprises particles having lengths, and a plurality of the particles are mixed non-unidirectionally within said resin.

33. The veneer-based product of claim 25, wherein the filler is not in the form of woven clothe.

* * * * *